(12) United States Patent
Nah et al.

(10) Patent No.: US 7,840,811 B2
(45) Date of Patent: Nov. 23, 2010

(54) NETWORK SYSTEM AND COMMUNICATION METHODS FOR SECURELY BOOTSTRAPING MOBILE IPV6 MOBILE NODE USING PRE-SHARED KEY

(75) Inventors: Jae Hoon Nah, Daejeon (KR); Hyeok Chan Kwon, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1018 days.

(21) Appl. No.: 11/635,181

(22) Filed: Dec. 7, 2006

(65) Prior Publication Data
US 2007/0136590 A1    Jun. 14, 2007

(30) Foreign Application Priority Data
Dec. 10, 2005    (KR) .................... 10-2005-0121236

(51) Int. Cl.
*H04L 9/00*    (2006.01)
*H04L 9/32*    (2006.01)
*G06F 11/00*    (2006.01)

(52) U.S. Cl. .................... 713/171; 713/172; 713/173; 713/174; 726/21; 726/22; 726/23; 726/24; 726/25

(58) Field of Classification Search .................. 713/171
See application file for complete search history.

(56) References Cited

U.S. PATENT DOCUMENTS

| 6,466,571 | B1 | 10/2002 | Dynarski et al. | |
|---|---|---|---|---|
| 2004/0105542 | A1* | 6/2004 | Takase et al. | 380/44 |
| 2006/0185013 | A1* | 8/2006 | Oyama et al. | 726/21 |

FOREIGN PATENT DOCUMENTS

| JP | 2002-033764 | 1/2002 |
|---|---|---|
| JP | 2004-274521 | 9/2004 |
| KR | 10-2002-0057293 | 7/2002 |
| KR | 1020060032100 | 4/2006 |

OTHER PUBLICATIONS

Maknavicius—"Inter Domain Security for Mobile IPv6—ECUMM 2002" (from filed "IDS").*
Maryline Laurent-Maknavicius; "Inter-Domain Security for Mobile IPv6;" Univesal Multiservice Networks, ECUMM 2002.
Perkins, C.E., et al., "AAA for IPv6 Network Access." Submitted to AAA Working Group, Internet Draft, May 1, 2003, <http://www.ietf.org>.

* cited by examiner

*Primary Examiner*—Longbit Chai
(74) *Attorney, Agent, or Firm*—Ladas & Parry LLP

(57) ABSTRACT

Provided is a network system using diameter authentication, authorization and accounting (AAA) infrastructure to support the bootstrapping of a Mobile Internet Protocol version 6 (IPv6) mobile node. The network system includes a mobile node equipped with Mobile IPv6, an attendant which is accessed by the mobile node when the mobile node moves toward a new network, an AAA local server which supports AAA processes for the mobile node in a local network, an AAA home server which supports AAA processes for the mobile node in a home network, and supports initial settings during the bootstrapping of the mobile node, and a home agent which handles binding update (BU) and binding acknowledgement (BA) regarding the mobile node. The AAA home server can configure initial settings for the mobile node that is authenticated by the AAA local server so that the mobile node can be effectively bootstrapped. Then, the AAA home server can distribute an IPsec SA to the mobile node and a home agent, and perform BU and BA based on the initial settings.

9 Claims, 5 Drawing Sheets

NETWORK SYSTEM AND COMMUNICATION METHODS FOR SECURELY BOOTSTRAPING MOBILE IPV6 MOBILE NODE USING PRE-SHARED KEY

CROSS-REFERENCE TO RELATED PATENT APPLICATION

This application claims the benefit of Korean Patent Application No. 10-2005-0121236, filed on Dec. 10, 2005, in the Korean Intellectual Property Office, the disclosure of which is incorporated herein in its entirety by reference.

BACKGROUND OF THE INVENTION

1. Field of the Invention

The present invention relates to the bootstrapping of a Mobile Internet Protocol version 6 (IPv6) mobile node, and more particularly, to a method and system for effectively supporting initial settings during the bootstrapping of a mobile node equipped with a Mobile IPv6.

2. Description of the Related Art

The present invention makes use of a conventional authentication, authorization, and accounting (AAA) infrastructure to support the bootstrapping of a Mobile Internet Protocol version 6 (IPv6) mobile node, and prior documents related to the present invention are as follows.

First, U.S. Pat. No. 6,466,571, entitled "Radius-Based Mobile Internet Protocol (IP) Address-to-Mobile Identification Number Mapping for Wireless Communication", discloses that a radius authentication server maintains mapping information of an IP address for a device and an identification number uniquely associated with the device, so that a home agent can support mobility of the device without managing location information based on the IP address. The radius authentication server sends an access-accept packet to the home agent in the event that the device is authorized to receive the IP packet, in which case the access-accept packet includes the identification information. The home agent uses the identification number to locate, page and automatically connect the wireless device to an IP network. Therefore, the home agent can support mobility of the device between networks without managing the IP address of the wireless device.

Second, IETF AAA Working Group focuses on development of an IETF Standards track protocol for "Diameter Mobile IPv6 Application." The Diameter Mobile IPv6 Application distributes a security association (SA) key in order to perform a binding update, locate the home agent, and protect the binding update in a cycle of AAA, which reduces the signaling overhead.

Korean Laid-Open patent publication No. 2002-57293 (Applicant: Hynix Semiconductor Inc.), entitled "Method of Embodying Local Authentication/Authorization/Accounting Function in All-IP Networks," discloses that in Next-Generation Mobile Communication Networks-based All-IP network environments, a radio access network (RAN) includes a local AAA server for authentication, authorization and accounting in order to distribute AAA functions in a core network to the RAN. In this Laid-Open patent publication, when authentication is required for a subscriber to the RAN, the local AAA server authenticates the subscriber and sends an authenticated result to an AAA server in a core network, so that the workload of the AAA server can be distributed.

SUMMARY OF THE INVENTION

The present invention provides a method and system for effectively supporting the bootstrapping of a Mobile Internet Protocol version 6 (IPv6) mobile node which can effectively assist initial settings during the bootstrapping of a Mobile IPv6 mobile node by improving the allocation of a home agent to a mobile node, the setting of a home address (HoA) for the mobile node, and the distribution of a pre-shared key (PSK)-based Internet Key Exchange (IKE) Phase 1 security key using a diameter-based technique, which is a type of authentication, authorization and accounting (AAA) infrastructure technique.

According to an aspect of the present invention, there is provided a network system using diameter authentication, authorization and accounting (AAA) infrastructure to support the bootstrapping of a Mobile Internet Protocol version 6 (IPv6) mobile node. The network system includes a mobile node equipped with Mobile IPv6, an attendant which is accessed by the mobile node when the mobile node moves toward a new network, an AAA local server which supports AAA processes for the mobile node in a local network, an AAA home server which supports AAA processes for the mobile node in a home network, and supports initial settings during the bootstrapping of the mobile node, and a home agent which handles binding update (BU) and binding acknowledgement (BA) regarding the mobile node.

According to another aspect of the present invention, there is provided a communication method. The communication method includes enabling a mobile node to use a local challenge (LC) value received from an attendant to transmit an AAA request message to the attendant, the AAA request message comprising a feature data that requests support for bootstrapping, transmitting the AAA request message received by the attendant to an AAA home server through an AAA local server, enabling the AAA home server to authenticate the mobile node and set bootstrapping information that is needed to bootstrap the mobile node, and enabling the MA home server to notify a home agent and the mobile node of authentication result information regarding the authentication of the mobile node and the bootstrapping information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
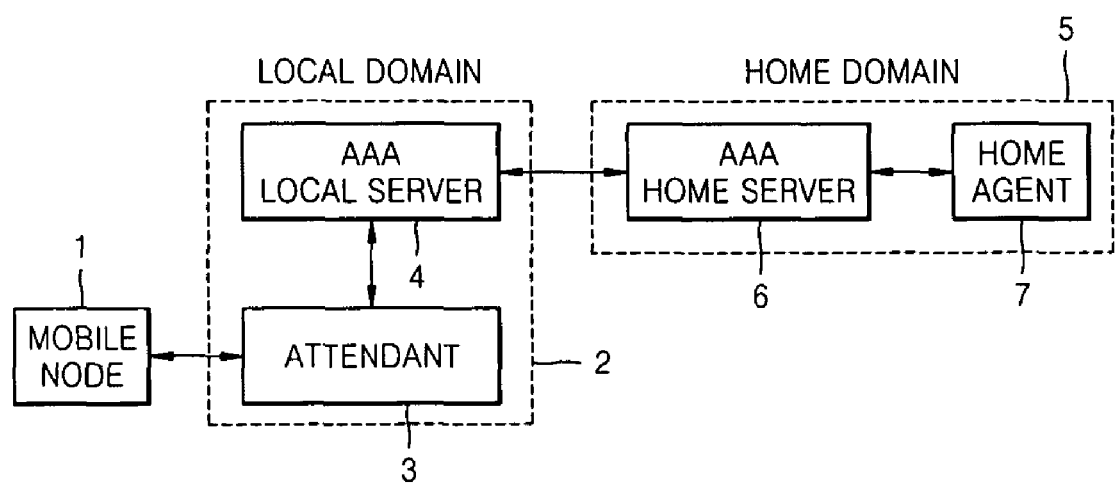
FIG. 1 is a block diagram of a diameter-based system for securely bootstrapping a Mobile Internet Protocol version 6 (IPv6) mobile node according to an embodiment of the present invention.

FIG. 1 is a block diagram of a diameter-based system for securely bootstrapping a Mobile Internet Protocol version 6 (IPv6) mobile node according to an embodiment of the present invention. Referring to FIG. 1, the system includes a mobile node 1, the attendant 3 that approaches the mobile node 1 when the mobile node 1 moves to a new network, an authentication, authorization and accounting (AAA) local server 4 which supports AAA processes for the mobile node 1 in a local network (or a local domain 2), an AAA home server 6 which supports AAA processes for the mobile node 1 in a home network (or a home domain 5), and allocates a home agent 7 to the mobile node 1, sets a home address HoA for the mobile node 1, and distributes an Internet Key Exchange (IKE) Phase 1 security key, for the purpose of initial setting of the mobile node, and the home agent (HA) 7 which manages location information of the mobile node 1.

The AAA home server 6, which is located in the home network of the mobile node 1, authenticates the mobile node 1, allocates the home agent 7 to the mobile node 1, sets a home address HoA for the mobile node 1, generates a pre-shared key (PSK) for distributing an IKE Phase 1 security key to the mobile node 1 and the home agent 7, and distributes the PSK to the mobile node 1 and the home agent 7.

The mobile node 1 is allowed through diameter infrastructure to access a network, and then stores home agent information and the home address HoA that are included in information received from the diameter infrastructure, and generates an IKE Phase 1 security key based on the PSK material distributed by the AAA home server 6, wherein the home agent information specifies a home agent allocated to the mobile node 1. IKE Phase 2 negotiation between the mobile node 1 and the home agent 7 is conducted based on a security key generated by the diameter infrastructure, thereby enabling the distribution of an Internet Protocol Security (IPsec) Security Association (SA). Thereafter, the mobile node 1 performs binding update (BU) and binding acknowledgement (BA) for registering a new location of the mobile node 1 using the IPsec SA.

The home agent 7 generates an IKE Phase 1 security key based on the PSK received from the AAA home server 6, distributes an IPsec SA through IKE Phase 2 negotiation with the mobile node 1, and handles BU and BA regarding the mobile node 1 for registering a new location of the mobile node 1 using the IPsec SA.

A diameter-based method of securely bootstrapping a Mobile IPv6 mobile node according to an embodiment of the present invention includes the mobile node 1 transmitting an AAA request message that comprises feature data requesting support for bootstrapping to the attendant 3 using a local challenge (LC) value received from the attendant 3; the attendant 3 transmitting the AAA request message to the AAA local server 4; the AAA home server 6 authenticating the mobile node 1 and supporting the bootstrapping of the mobile node 1; and the AAA home server 6 notifying the home agent 7 and the mobile node 1 of the results of the authentication of the mobile node 1 and information regarding the bootstrapping of the mobile node 1.

According to the present embodiment, the operation of the AAA home server 6 includes authenticating the mobile node 1 based on a network access identifier (NAI) of the mobile node 1; allocating one of a plurality of home agents that are managed by the AAA home server 6 to the mobile node 1 by comparing the workloads of the home agents; setting a home address for the mobile node 1 in connection with the allocation of a home agent; and distributing a PSK to the mobile node 1 and the home agent allocated to the mobile node 1 for supporting IKE processes.

According to the present embodiment, the AAA home server 6 may transmit information to the home agent 7 after performing authentication of the mobile node 1, and the information includes a home address of the mobile node 1, a home agent address HaA, Noncei and SA1i received from the mobile node 1, and a PSK value.

According to the present embodiment, the AAA home server 6 may transmit information to the mobile node 1 after performing authentication of the mobile node 1, and the information includes the results of the authentication of the mobile node 1, the home agent address HaA allocated to the mobile node 1, home address information set for the mobile node 1, Noncer and SA1r received from the home agent allocated to the mobile node 1, and a PSK material value that is needed to generate a PSK.

Figure 2:
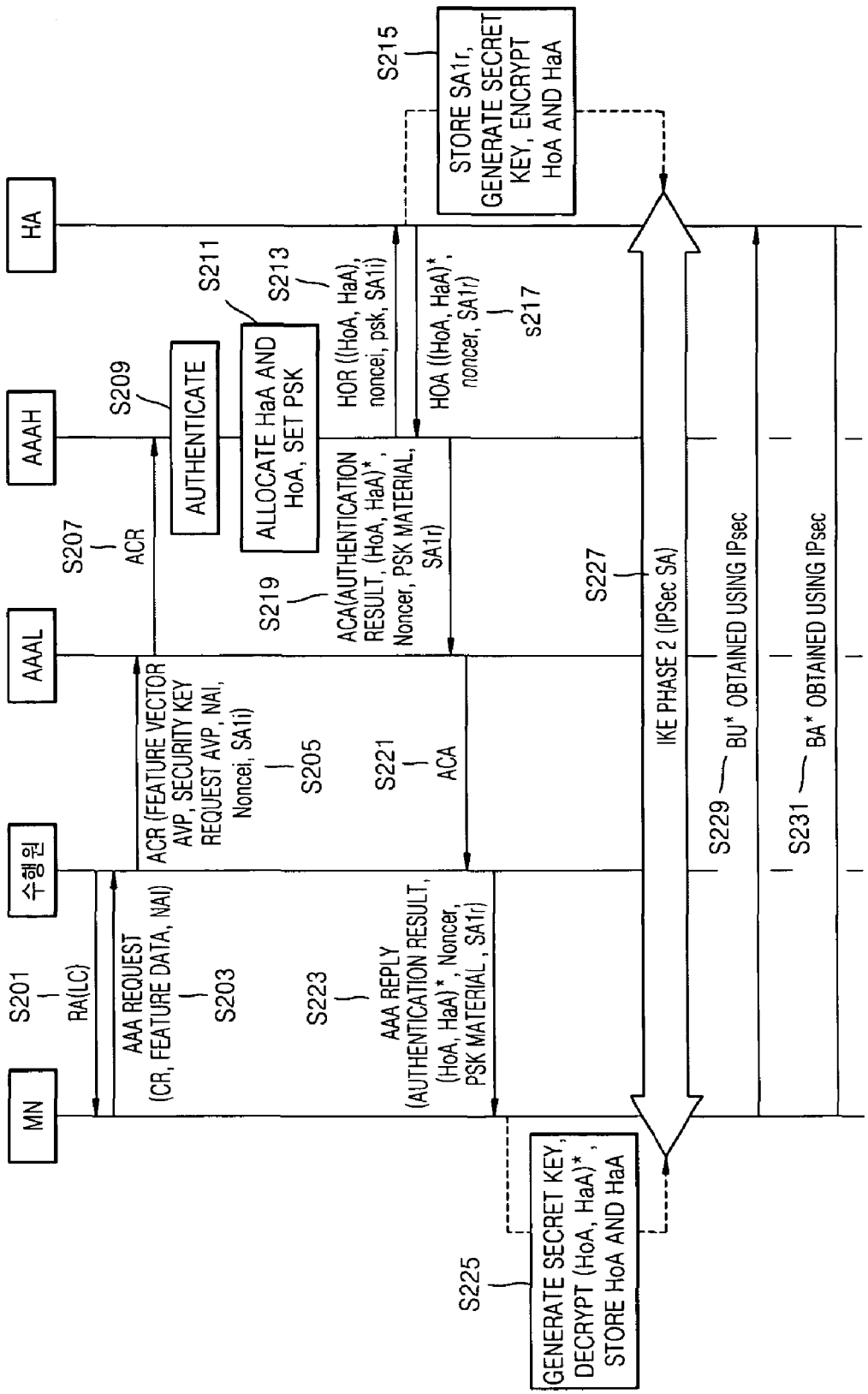
FIG. 2 is a flowchart illustrating a diameter-based method of securely bootstrapping a Mobile IPv6 mobile node according to an embodiment of the present invention.

A diameter-based method for securely bootstrapping a Mobile IPv6 mobile node according to an embodiment of the present invention, i.e., the operation of the diameter-based system illustrated in FIG. 1, is illustrated in FIG. 2.

Referring to FIG. 2, in operation S201, the mobile node 1 (MN) receives a router advertisement (RA) message transmitted by the attendant 3 which is located in the local network 2 that is adjacent to the mobile node 1, and determines whether the RA message comprises local challenge (LC) information. In operation S203, the mobile node 1 uses the LC information to generate an AAA request message that comprises a replay protection indicator (RPI), an NAI, a CRedential (CR), and feature data requesting support for bootstrapping, and transmits the AAA request message to the attendant 3.

In operation S205, the attendant 3 generates an AAA client request (ACR) message that comprises a feature vector attribute value pair (AVP), a security key request AVP, an NAI, Noncei, and SA1i, and transmits the ACR message to the AAA local server 4 (AAAL). In operation S207, the AAA local server 4 transmits the ACR message to the AAA home server 6 (AAAH).

In operation S209, the AAA home server 6 authenticates the mobile node 1 based on the NAI provided by the mobile node 1. In operation S211, if the mobile node 1 is successfully authenticated, the AAA home server 6 allocates a home agent 7 (HA) to the mobile node 1, sets a home address HoA for the mobile node 1, and generates a PSK. In operation S213, the AAA home server 6 transmits a home agent Mobile IPv6 request (HOR) message that comprises the home address HoA, an address HaA of the home agent 7, a PSK, Noncei and SA1i to the home agent 7 as the results of the authentication performed in operation S209.

In operation S215, the home agent 7 receives authentication information of the mobile node 1, the PSK, Noncei, and SA1i, and generates an IKE Phase 1 security key, and generates (HoA, HaA)* by encrypting the home address HoA and the home agent address with the IKE Phase 1 security key, and stores SA1r. Thereafter, in operation S217, the home agent 7 transmits a home agent Mobile IPv6 reply (HOA) message to the AAA local server 4 as a response to the information received from the AAA home server 6 in operation S215. The HOA message comprises Noncer, SA1r, and (HoA, HaA)*.

In operation S219, the AAA home server 6 transmits an AAA client answer (ACA) message to the AAA local server 4 in response to the HOA message transmitted by the home agent 7. The ACA message comprises the results of the authentication of the mobile node 1, Noncer, SA1r, (HoA, HaA)*, and a PSK material value.

In operation S221, the AAA local server 4 transmits the ACA message to the attendant 3. In operation S223, the attendant 3 sets an access right for the mobile node 1 according to the results of the authentication of the mobile node 1, and transmits an AAA reply message to the mobile node 1.

In operation S225, the mobile node 1 generates an IKE Phase 1 security key using Noncer, SA1r, and the PSK material value included in the AAA reply message, obtains the home address HoA and the home agent address HaA by decrypting (HoA, HaA)* with the IKE Phase 1 security key, and sets the home agent 7 as a home agent to manage the location of the mobile node 1 and sets a home address. Also, in operation S225, the mobile node 1 stores the home address HoA, the home agent address HaA, and SA1r.

Thereafter, in operation S227, the mobile node 1 and the home agent 7 conduct IKE Phase 2 negotiation for distributing an IPsec SA. In operation S229, the mobile node 1 transmits a BU* message that is encrypted with the IPsec SA to the home agent 7. Then, the home agent 7 transmits a BA* message that is encrypted with the IPsec SA to the mobile node 1 in response to the BU* message.

Figure 3:
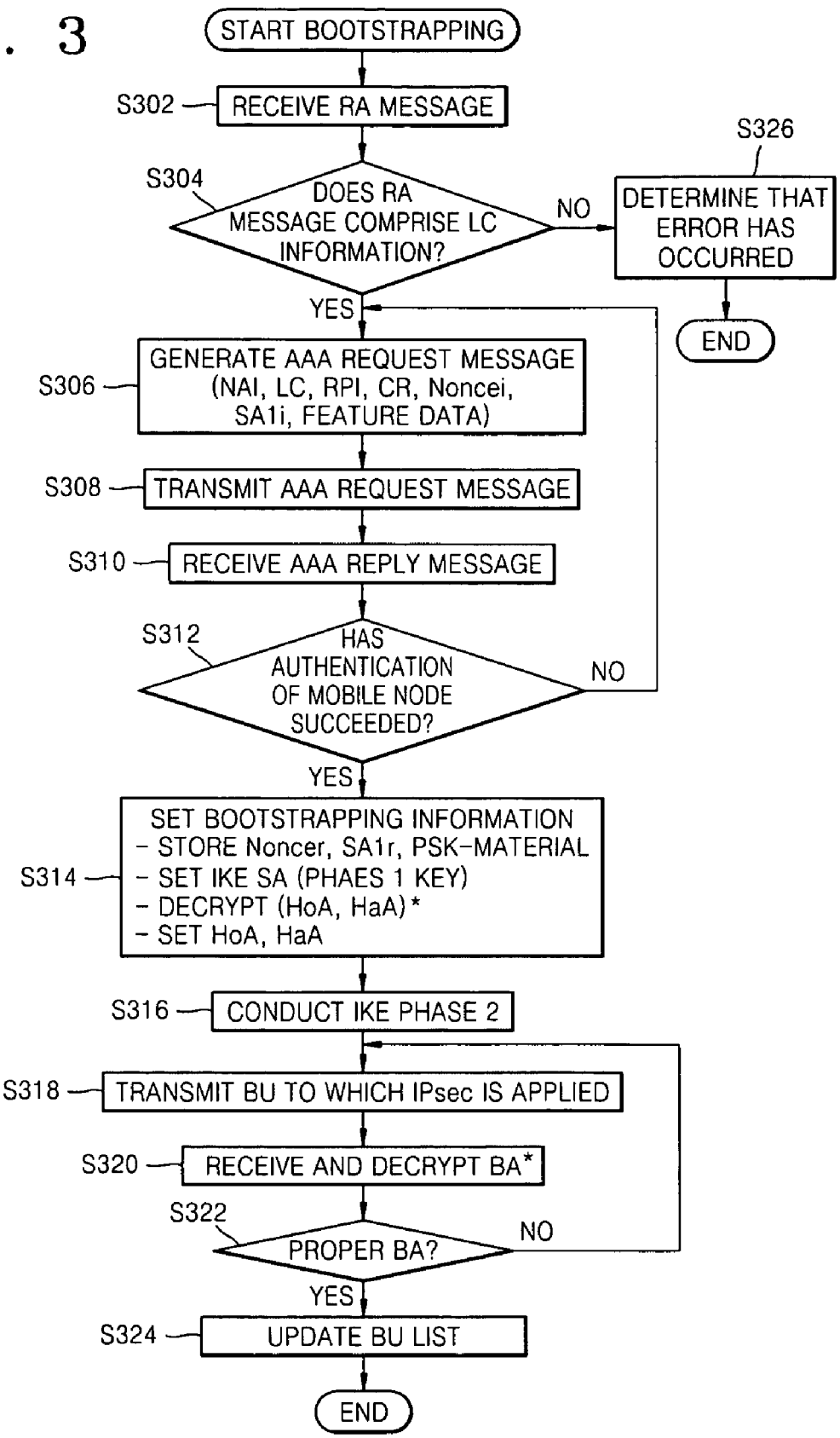
FIG. 3 is a flowchart illustrating the operation of a mobile node which is an element of the diameter-based system illustrated in FIG. 1, according to an embodiment of the present invention.

FIG. 3 is a flowchart illustrating the operation of the mobile node 1, which is an element of the diameter-based system illustrated in FIG. 1, according to an embodiment of the present invention. The operation of the mobile node 1 will hereinafter be described in further detail with reference to FIGS. 2 and 3.

Referring to FIGS. 2 and 3, in operation S302, the mobile node 1 receives an RA message from the attendant 3. In operation S304, the mobile node 1 determines whether the RA message comprises LC information. If it is determined in operation S304 that the RA message comprises LC information, then in operation 306, the mobile node 1 generates an AAA request message. The AAA request message comprises an RPI, an NAI, a CR, and feature data that requests bootstrapping. In operation S308, the mobile node 1 transmits the AAA request message to the attendant 3. Signal processing performed by the mobile node 1 after operation S308 will become apparent by referencing operations following operation S205 of FIG. 2.

In operation S310, the mobile node 1 receives an AAA reply message from the attendant 3. In operation S312, the mobile node 1 determines whether the mobile node 1 has been successfully authenticated based on authentication result information included in the AAA reply message. In operation S314, if it is determined in operation S312 that the mobile node has been successfully authenticated, the mobile node 1 sets bootstrapping information. Also, in operation S314, the mobile node 1 stores Noncer, SA1r, and a PSK material value, sets an IKE SA (i.e., an IKE Phase 1 security key), obtains a home address HoA and a home agent address HaA by decrypting (HoA, HaA)*, and sets or stores the home address HoA and the home agent address HaA. In operation S316, the mobile node 1 conducts IKE Phase 2 together with the home agent 7. In operation S318, the mobile node 1 transmits a BU* message to which the IPsec SA is applied, i.e., an encrypted BU message BU*, to the home agent 7.

In operation S320, the mobile node 1 receives an encrypted BA message BA* from the home agent 7 and decrypts the BA* message to obtain a BA message. In operation S322, the mobile node determines whether the obtained BA message is a proper BA message. In operation S324, if it is determined in operation S322 that the obtained BA message is a proper BA message, the mobile node 1 updates a BU list stored in the mobile node 1 and terminates a bootstrapping operation. If it is determined in operation S322 that the obtained BA message is not a proper BA message, the mobile node 1 performs operations S318 through S322 again.

In operation S326, if it is determined in operation S304 that the RA message does not comprise LC information, the mobile node 1 determines that an error has occurred and terminates a bootstrapping operation.

Figure 4:
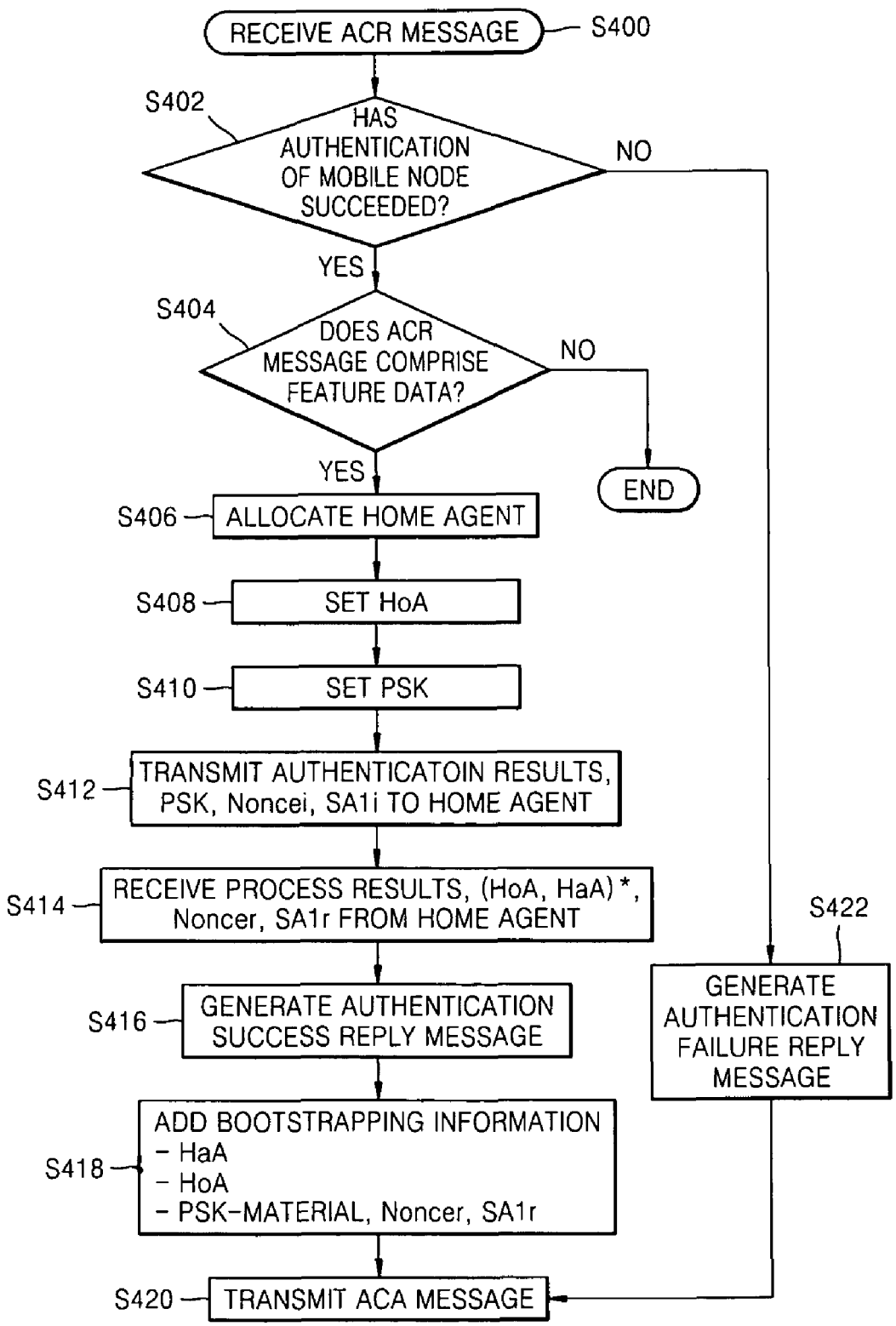
FIG. 4 is a flowchart illustrating the operation of an authentication, authorization and accounting (AAA) home server, which is an element of the diameter-based system illustrated in FIG. 1, according to an embodiment of the present invention.

FIG. 4 is a flowchart illustrating the operation of the MA home server 6, which is an element of the diameter-based system illustrated in FIG. 1, according to an embodiment of the present invention. Referring to FIG. 4, in operation S400, an ACR message is received. In operation S402, the AAA home server 6 determines whether the mobile node 1 has been successfully authenticated. In operation S404, if it is determined in operation S402 that the mobile node 1 has been successfully authenticated, the AAA home server 6 determines whether the ACR message comprises feature data that requests bootstrapping. If it is determined in operation S402 that the ACR message does not comprise feature data that requests bootstrapping, then the AAA home server 6 terminates a bootstrapping support operation. In operation S406, if it is determined in operation S402 that the ACR message comprises feature data that requests bootstrapping, then the AAA home server 6 allocates the home agent 7 to the mobile node 1. In operation S408, the AAA home server 6 sets a home address HoA for the mobile node 1. In operation S410, the AAA home server 6 sets a PSK. In operation S412, the AAA home server 6 transmits authentication result information regarding the authentication of the mobile node 1, the PSK, Noncei, and SA1i to the home agent 7.

In operation S414, the results of processes performed by the home agent 7, (HoA, HaA)*, Noncer, and SA1r are received from the home agent 7. In operation S416, the AAA home server 6 generates an authentication success reply message. In operation S418, the AAA home server 6 adds bootstrapping information that comprises the address of the home agent 7 (i.e., the home agent address HaA), the home address HoA, a PSK material value, Noncer, and SA1r to the authentication success reply message. In operation S420, the AAA home server 6 transmits an ACA message that comprises the authentication success reply message to the mobile node 1. In operation S422, if it is determined in operation S402 that the authentication of the mobile node 1 has failed, the AAA home server 6 generates an authentication failure reply message. In operation S424, the AAA home server 6 transmits an ACA message that comprises the authentication failure reply message to the mobile node 1.

Figure 5:
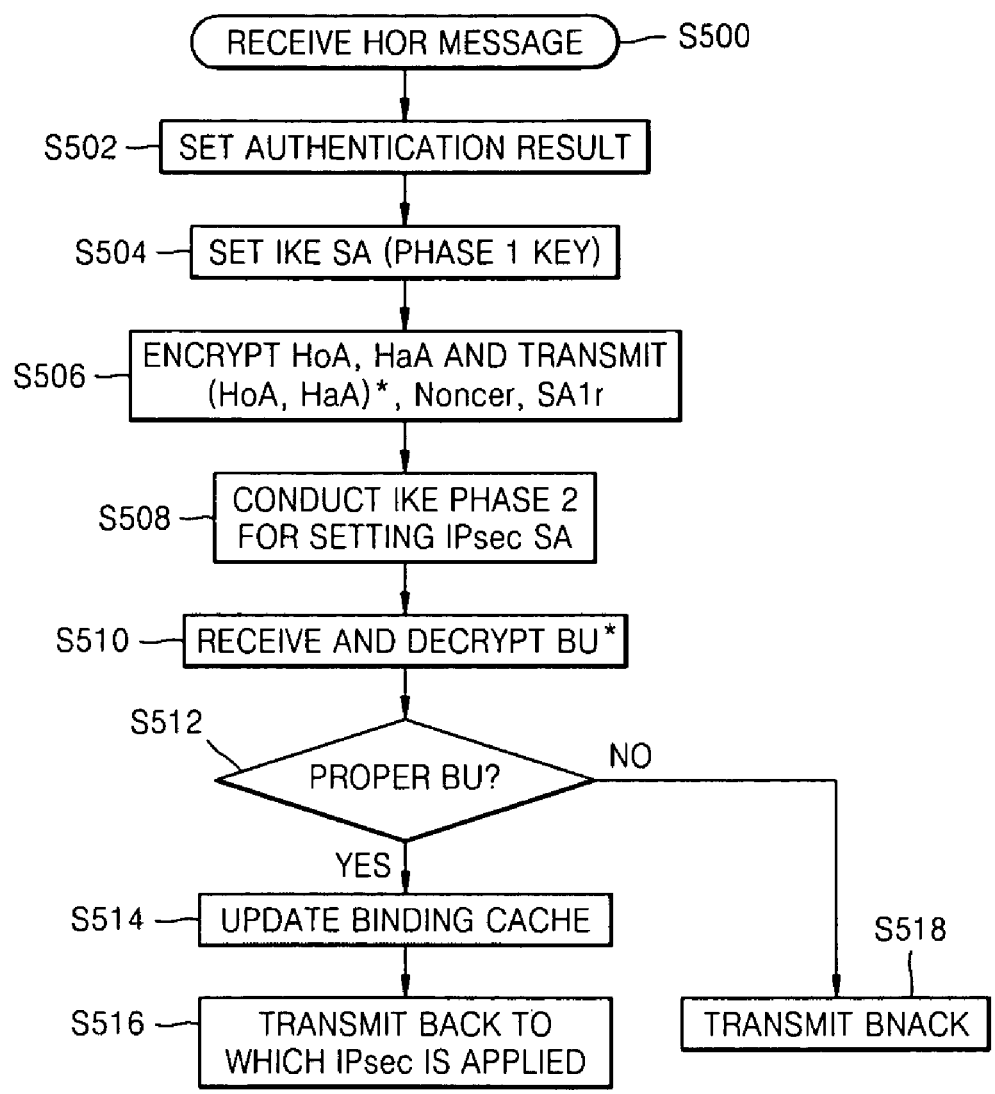
FIG. 5 is a flowchart illustrating the operation of a home agent, which is an element of the diameter-based system illustrated in FIG. 1, according to an embodiment of the present invention.

FIG. 5 is a flowchart illustrating the operation of the home agent 7, which is an element of the diameter-based system illustrated in FIG. 1, according to an embodiment of the present invention. Referring to FIG. 5, in operation S500, an HOR message is received. In operation S502, the home agent 7 sets authentication result information regarding the authentication of the mobile node 1. In operation S504, the home agent 7 sets an IKE SA Phase 1 security key. In operation S506, the home agent 7 transmits an HOA message that comprises (HoA, HaA)*, Noncer, and SA1r to the AAA home server 6.

If the home agent 7 transmits the HOA and, in response, the mobile node 1 receives an AAA reply message (operations S217 and S225 of FIG. 2), then in operation S508, the home agent 7 conducts IKE Phase 2 for setting an IPsec SA (operation S227 of FIG. 2). In operation S510, an encrypted BU message BU* is received, and the home agent 7 decrypts the encrypted BU message BU*, thereby obtaining a BU message. In operation S512, the home agent 7 determines whether the BU message is a proper BU message. In operation S514, if it is determined in operation S512 that the BU message is a proper BU message, then the home agent 7 updates a binding cache. In operation S516, the home agent 7 transmits an encrypted BA message BA* containing binding update acknowledgement (BACK) information to which IPsec is applied to the mobile node 1. In operation S518, if it is determined in operation S512 that the BU message is not a proper BU message, then the home agent 7 transmits an encrypted BA message BA* containing binding update non-acknowledgement (BNACK) information to the mobile node 1.

Recent developments in wireless mobile Internet technology have opened the way for the commercialization of Mobile IPv6 mobile terminals. For a fast deployment of Mobile IPv6 mobile terminals, Mobile IPv6 bootstrapping techniques capable of dynamically configuring initial settings of Mobile IPv6 mobile terminals are needed. According to the present invention, an AAA home server can configure initial settings for a mobile node that is authenticated by an AAA local server so that the mobile node can be effectively bootstrapped. Then, the AAA home server can distribute IPsec SA to the mobile node and a home agent, and perform BU and BA based on the initial settings. Accordingly, it is possible to ensure a secure bootstrapping between the mobile node and the home agent. In addition, according to the present invention, diameter AAA techniques are used to set a home address, a home agent address, and an IKE Phase 1 security key. Thus, it is possible to effectively lightweight key exchange algorithms for a mobile Internet environment.

What is claimed is:

1. A network system using diameter authentication, authorization and accounting (AAA) infrastructure to support bootstrapping of a Mobile Internet Protocol version 6 (IPv6) mobile node, the network system comprising:
   a mobile node equipped with Mobile IPv6;
   an attendant which is accessed by the mobile node when the mobile node moves into a new network;
   an AAA local server which supports AAA processes for the mobile node in a local network;
   an AAA home server which supports AAA processes for the mobile node in a home network, and supports initial settings during the bootstrapping of the mobile node; and
   a home agent which handles binding update (BU) and binding acknowledgement (BA) regarding the mobile node,
   wherein after being allowed to access a network through the AAA infrastructure, the home agent is allocated to the mobile node and a home address is set to the mobile node based on information received from the AAA infrastructure,
   wherein the mobile node receives a random number, and security key material and generates a PSK based on the random number, and the security key material;
   wherein the mobile node generates an IKE Phase 1 security key based on the PSK, and distributes an Internet Protocol Security (IPsec) Security Association (SA) by conducting IKE negotiation with the home agent; and
   wherein the mobile node performs BU and BA using the IPsec SA in order to register a new location of the mobile node.

2. The network system of claim 1, wherein the AAA home server is located in the home network of the mobile node, authenticates the mobile node, allocates the home agent to the mobile node, sets a home address for the mobile node, and generates a pre-shared key (PSK) for distributing an Internet Key Exchange (IKE) Phase 1 security key.

3. The network system of claim 2, wherein, when distributing the PSK, the AAA home server transmits the PSK to the home agent and transmits security key material information that is needed to generate the PSK to the mobile node.

4. The network system of claim 1, wherein after being allowed to access a network through the AAA infrastructure, the home agent is allocated to the mobile node and a home address is set to the mobile node based on information received from the AAA infrastructure,
   the mobile node receives Noncer, SA1r, and security key material and generates a PSK based on Noncer, SA1r, and the security key material, generates an IKE Phase 1 security key based on the PSK, and distributes an Internet Protocol Security (IPsec) Security Association (SA) by conducting IKE negotiation with the home agent, and performs BU and BA using the IPsec SA in order to register a new location of the mobile node.

5. The network system of claim 1, wherein the home agent generates an IKE Phase 1 security key based on a PSK received through the AAA infrastructure, distributes an IPsec SA by conducting IKE negotiation with the mobile node, and performs BU and BA using the IPsec SA in order to register a new location of the mobile node.

6. A communication method comprising, the method comprising:
   providing a processor and a memory, the memory having stored thereon:
   enabling a mobile node to use a local challenge (LC) value received from an attendant to transmit an AAA request message to the attendant, the AAA request message comprising feature data that requests support for bootstrapping;
   transmitting the AAA request message received by the attendant to an AAA home server through an AAA local server,
   enabling the AAA home server to authenticate the mobile node and set bootstrapping information that is needed to bootstrap the mobile node; and
   enabling the AAA home server to notify a home agent and the mobile node of the result of authentication regarding the mobile node and the bootstrapping information,
   wherein the AAA home server transmits a message that comprises the authentication result information, a random number to the home agent after performing the authentication of the mobile node;
   wherein the AAA home server transmits a message that comprises the authentication result information and a home agent address allocated to a mobile node, home address, the random number, and a PSK material toward the mobile node after performing the authentication of the mobile node;
   wherein the mobile node is configured generate a PSK based on the received random number and the PSK material;
   wherein the mobile node is configured to generate an IKE Phase 1 security key based on the PSK and distributes an Internet Protocol Security (IPsec) Security Association (SA) by conducting IKE negotiation with the home agent; and
   wherein the mobile node is configured to perform binding update (BU) and binding acknowledgement (BA) regarding the mobile node using the IPsec SA in order to register a new location of the mobile node.

7. The communication method of claim 6, wherein the support for bootstrapping comprises:

enabling the AAA home server to authenticate the mobile node based on a network access identifier (NAI) of the mobile node;

enabling the AAA home server to compare the workloads of a plurality of home agents that are managed by the AAA home server and allocate one of the plurality of home agents to the mobile node based on the result of the comparison;

enabling the AAA home server to set a home address for the mobile node in connection with the allocation of a home agent to the mobile node; and distributing a PSK to the mobile node and the home agent allocated to the mobile node.

8. A communication method using a PSK, the method comprising:

providing a processor and a memory, the memory having stored thereon:

using diameter infrastructure when an Internet Protocol Security (IPsec) Security Association (SA) is distributed through IKE to a mobile node equipped with Mobile IPv6 and to a home agent in order to protect a binding update (BU) message transmitted between the mobile node and the home agent, wherein the mobile node is configured to receive a random number, and security key material and then generate a PSK based on the random number, and the security key material;

wherein the mobile node is configured to generate the IKE based on the PSK and distribute the IPsec SA by conducting IKE negotiation with the home agent; and wherein the mobile node is configured to perform binding update (BU) and binding acknowledgement (BA) regarding the mobile node using the IPsec SA in order to register a new location of the mobile node.

9. A communication method, the method comprising:

providing a processor and a memory, the memory having stored thereon:

setting an IKE Phase 1 security key between a mobile node and a home agent using AAA infrastructure during bootstrapping of the mobile node for supporting initial settings for the mobile node, wherein the mobile node is configured to receive a random number, and security key material and then generate a PSK based on the random number, and the security key material;

wherein the mobile node is configured to generates an IKE Phase 1 security key based on the PSK, and distributes an Internet Protocol Security (IPsec) Security Association (SA) by conducting IKE negotiation with the home agent; and wherein the mobile node performs binding update (BU) and binding acknowledgement (BA) using the IPsec SA in order to register a new location of the mobile node.

\* \* \* \* \*